(No Model.) 4 Sheets—Sheet 1.
G. W. LEWIS.
GAS ENGINE.
No. 511,535. Patented Dec. 26, 1893.
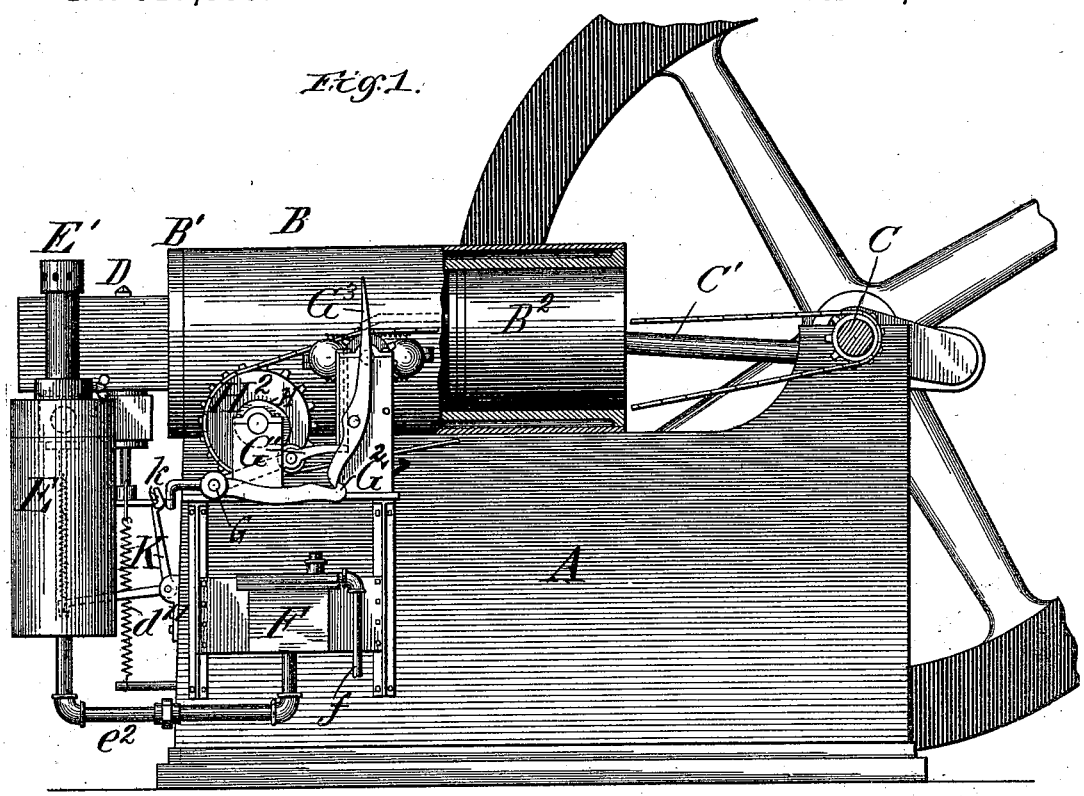
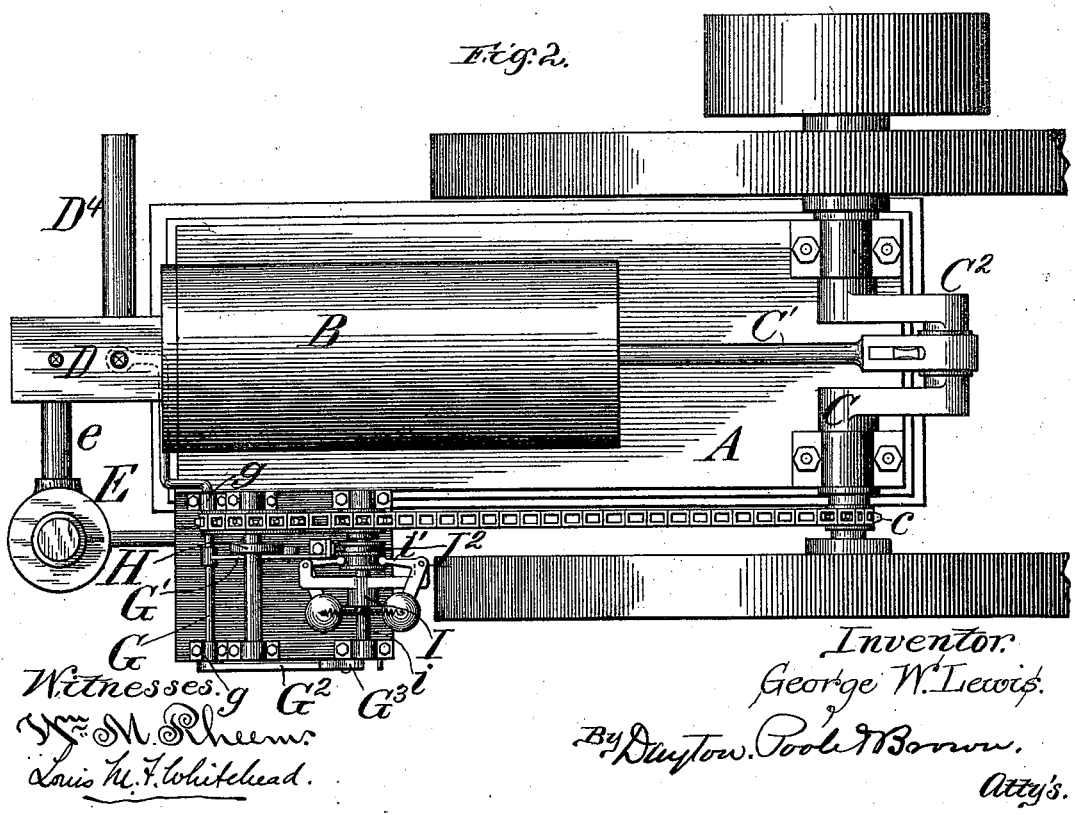
Witnesses.
Wm. M. Rheem.
Louis M. F. Whitehead.
Inventor.
George W. Lewis.
By Dayton, Poole & Brown.
Atty's.
THE NATIONAL LITHOGRAPHING COMPANY,
WASHINGTON, D. C.

(No Model.) 4 Sheets—Sheet 2.
G. W. LEWIS.
GAS ENGINE.
No. 511,535. Patented Dec. 26, 1893.
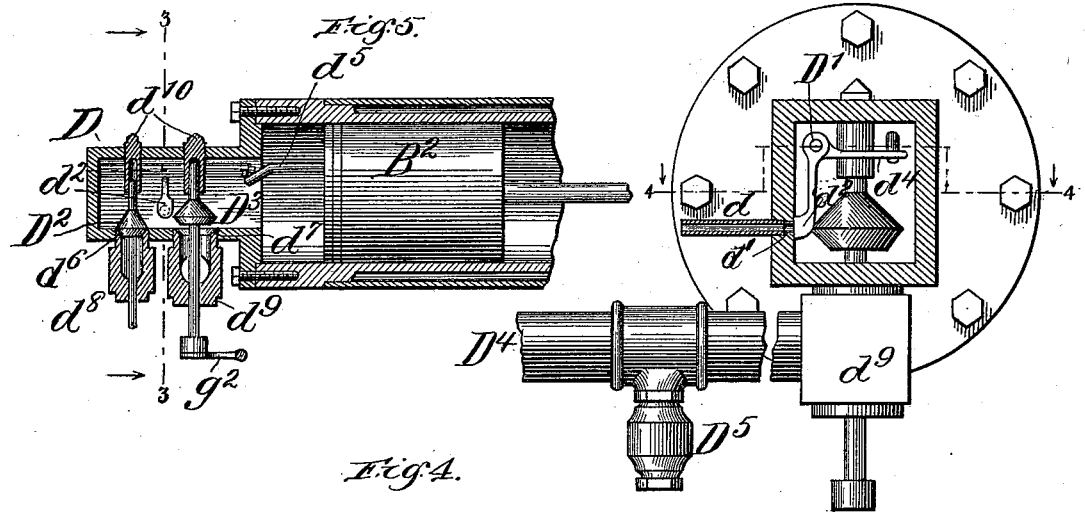
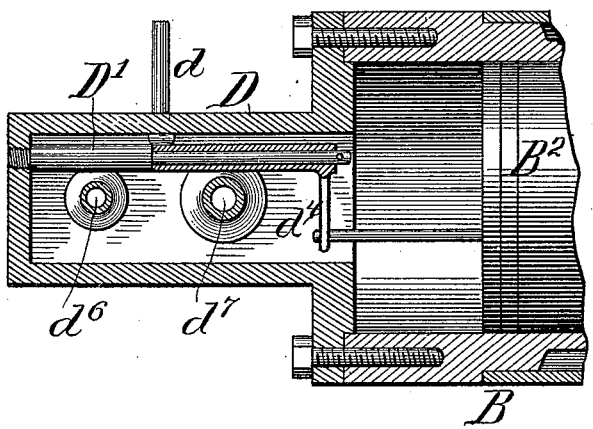
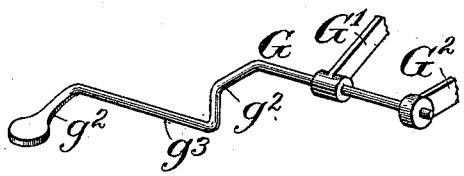
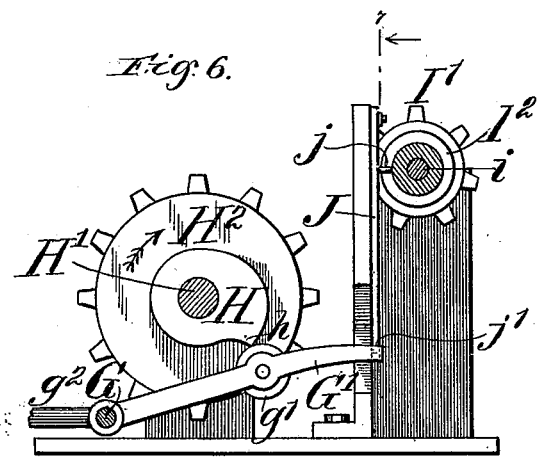
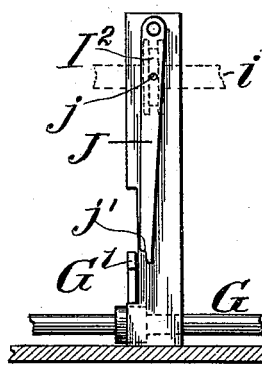
Witnesses
Wm. M. Rheem.
Louis M. F. Whitehead.
Inventor.
George W. Lewis.
By Dayton, Poole & Brown,
Atty's.

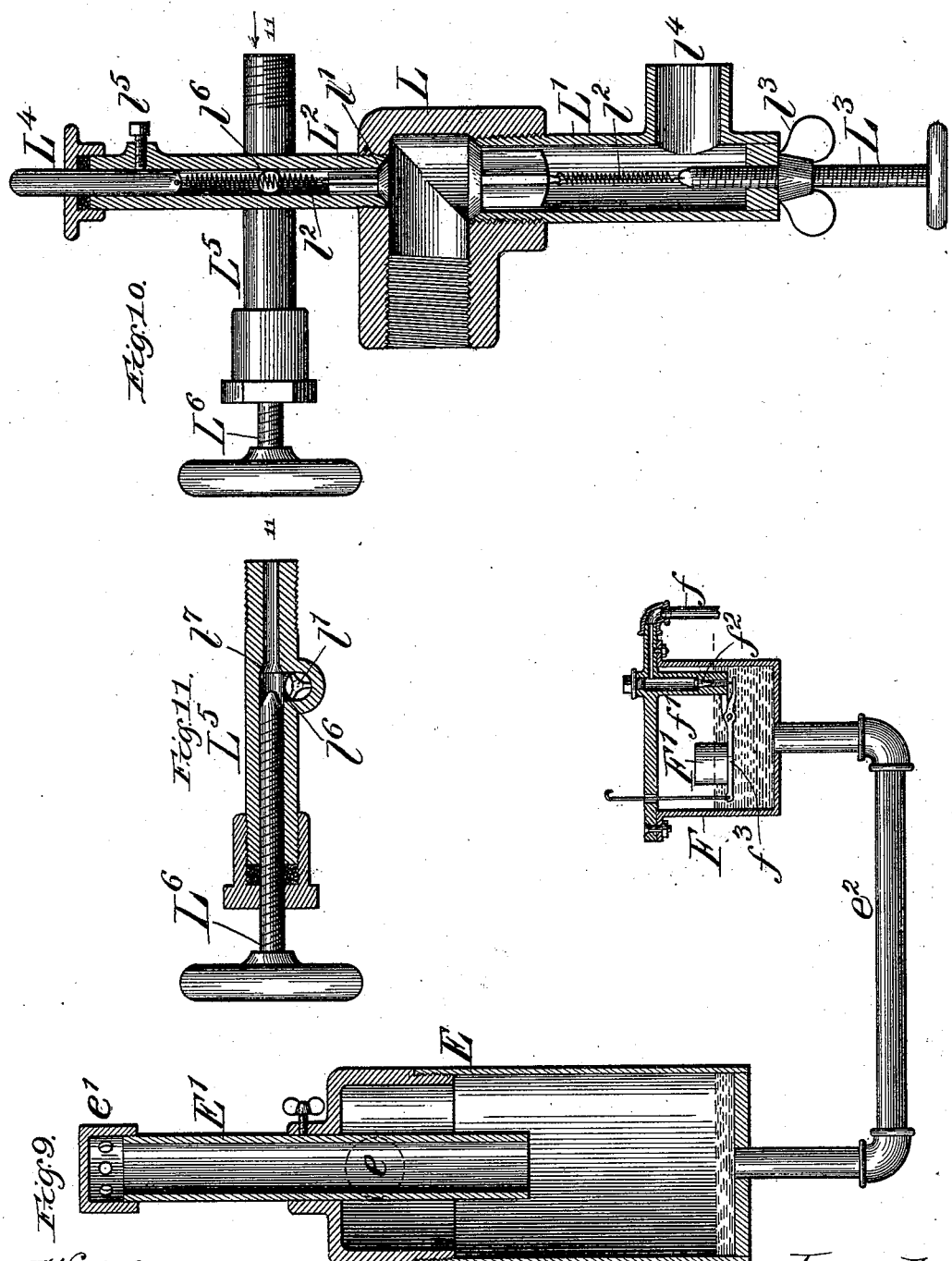

(No Model.) 4 Sheets—Sheet 4.
G. W. LEWIS.
GAS ENGINE.
No. 511,535. Patented Dec. 26, 1893.
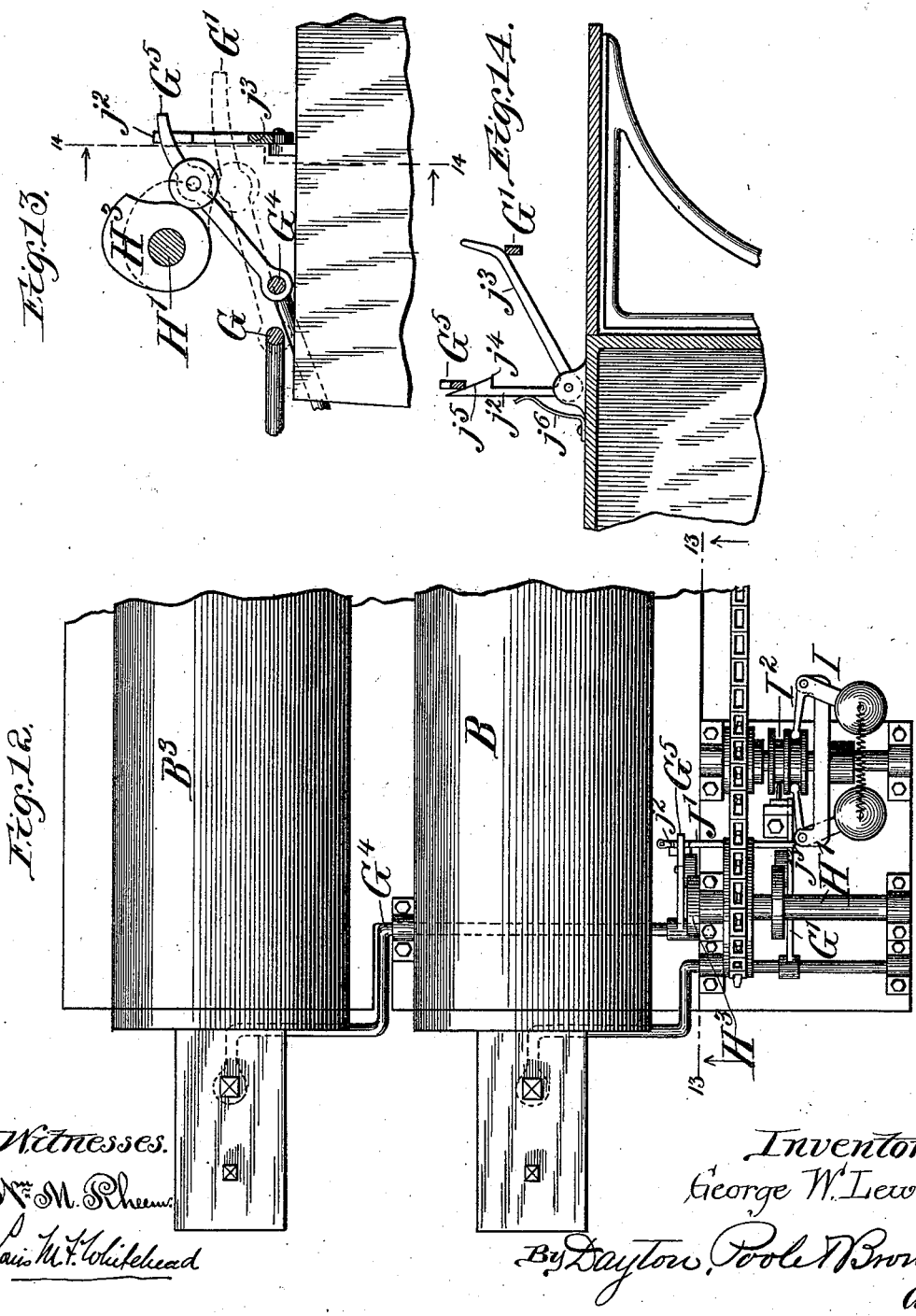

UNITED STATES PATENT OFFICE.

GEORGE W. LEWIS, OF PERU, ILLINOIS.

GAS-ENGINE.

SPECIFICATION forming part of Letters Patent No. 511,535, dated December 26, 1893.

Application filed March 13, 1891. Serial No. 384,876. (No model.)

*To all whom it may concern:*

Be it known that I, GEORGE W. LEWIS, of Peru, in the county of La Salle and State of Illinois, have invented certain new and useful Improvements in Gas-Engines; and I do hereby declare that the following is a full, clear, and exact description thereof, reference being had to the accompanying drawings, and to the letters of reference marked thereon, which form a part of this specification.

This invention relates to the valve system of so-called gas engines and to means for vaporizing gasoline and similar liquids in case it is proposed to use such vapor with air in this class of engines.

The invention has for its objects to simplify the construction and improve the operation of gas engines generally and, in its adaptation to the use of vapor of gasoline, to provide for the better regulation of the proportion of vapor produced in the operation of the engine.

In the accompanying drawings illustrating my invention: Figure 1 is a side elevation of an engine containing my improvements, a part of the cylinder being broken away to show the piston in its extreme outer position. Fig. 2 is a top or plan view of the engine with the piston and other moving parts in the positions indicated in Fig. 1. Fig. 3 is an enlarged end view of the power cylinder and vertical transverse section of the ignition chamber midway between the induction and exhaust valves, or in the line 3—3 of Fig. 5. Fig. 4 is an enlarged horizontal section of a portion of the power cylinder and of the ignition chamber in the indirect line 4—4 of Fig. 3. Fig. 5 is a central vertical section of the power cylinder and ignition chamber on the scale of Figs. 1 and 2, the piston and other interior parts being shown in side elevation. Fig. 6 is a side elevation of the cam wheel by which the exhaust valve is operated, and also a side view of the lever which is acted upon by the cam wheel of the stop lever which engages said lever on the attainment of a fixed limit of speed, and of the sliding collar which vibrates the stop lever into and out of engagement with the cam lever under the action of the governor—said sliding collar being shown in section transverse of its shaft and through its peripheral groove. Fig. 7 is an end view of the cam lever, a side elevation of the stop lever, and a side view of the grooved collar operating to vibrate the stop lever, said collar and its shaft being indicated in dotted lines. Fig. 8 is a detached view of the transverse portion of the lever system for lifting the exhaust valve from its seat. Fig. 9 is an enlarged vertical section of the chamber within which gasoline is vaporized and to which air is initially induced for the purpose of effecting such vaporization. This figure also illustrates in central vertical section a valve box and mechanism for the regulation of the supply of gasoline to the chamber first mentioned. Fig. 10 illustrates, principally in central vertical section, a device for simultaneously admitting air and illuminating or other gas, to be used instead of the gasoline supply and regulating devices shown in Fig. 9 when illuminating or other gas is to be employed. Fig. 11 is a longitudinal section of the gas induction pipe of Fig. 10. Fig. 12 is a fragmentary plan view of a duplex or two-cylinder engine illustrating means for operating the exhaust valve of the second cylinder. Fig. 13 is a side elevation of the second cam and the lever through which it operates the exhaust valve of the second cylinder. Fig. 14 is a detail.

First describing my invention in its application to a single engine and with reference to Figs. 1 to 11 inclusive, A represents the frame, B a power cylinder and C the crank shaft carrying a fly wheel. The cylinder B is closed at its rear end only by the head B' and contains the plunger or piston B² connected by the shaft C' with the crank C² of the shaft C.

D is the ignition chamber communicating with the interior of the cylinder B through the head B', as illustrated in Figs. 4 and 5, $d$ (Fig. 3) is the ignition tube opening into the ignition chamber D through a passage $d'$, and $d^2$ is a valve applied to the opening $d'$ within the chamber D. This valve is carried at the end of an arm $d^3$ which, in this instance, projects laterally from a rock shaft D' having its axis lengthwise of the cylinder and provided with a second lateral arm $d^4$. Beneath the arm $d^4$ passes the rod $d^5$ which projects from the rear end of the piston B², said rod $d^5$ having an inclined upper surface which, as it passes beneath the arm $d^4$, raises said arm and swings the valve $d^2$ away from the opening $d'$.

The ignition chamber D is provided with an induction opening $d^6$ and an eduction or exhaust opening $d^7$ to which are respectively applied the valves $D^2$ and $D^3$. These valves are here shown as of the poppet order and as having their seats in the upper ends of chambered fittings $d^8$ $d^9$ screwed into the bottom wall of the ignition chamber so that said valves may tend to close by the action of gravity. The fittings $d^8$ and $d^9$ also afford passages for stems of the valves $D^2$ $D^3$ which project downwardly through the fittings, as indicated in Figs. 3 and 5. These valves are also shown provided with upwardly projecting stems which slide in guide fittings $d^{10}$ screwed into the upper wall of the ignition chamber, as shown also in Figs. 3 and 5.

E is a vaporizing chamber employed when vapor of gasoline or other suitable volatile liquid is the combustible used. This is shown as a vertical cylinder communicating through a pipe $e$ leading from its upper portion to the induction opening $d^6$ of the ignition chamber through the fitting $d^8$. Through the top of the cylinder E projects an air pipe E' having its ends open but preferably provided with a perforated cap $e'$, as shown in Figs. 1 and 9. This air pipe E' is vertically adjustable so that its lower end may be brought to any desired position with reference to the surface of the liquid admitted to said cylinder, such adjustment being effected, as shown, by moving the pipe in the passage provided for it in the head of the cylinder and fastening it with a set screw. Obviously such adjustment may be otherwise provided for. Connected with the bottom of the chamber E is a pipe $e^2$ leading from a source of liquid supply.

F is a box or chamber discharging into the pipe $e^2$ and being itself supplied through a pipe $f$ desirably connected with a tank having suitable elevation to allow the gasoline to flow to the box F by gravity. Within an interior prolongation $f'$ of the pipe $f$ is arranged a valve $f^2$ controlled by a float F' through the medium of a lever $f^3$. The box F is so arranged with reference to the bottom of the cylinder E as to insure the presence of a quantity of gasoline covering the bottom of said cylinder, as shown in Fig. 9.

In the operation of the engine within its predetermined limit of speed, each alternate outward movement of the piston $B^2$, by its tendency to form a vacuum behind it and within the induction chamber, causes the induction valve $D^2$ to rise and produces a forcible inflow of air through the air supply pipe E' into the cylinder E and upon the surface of the gasoline therein contained. Upon the succeeding return stroke of the piston, it will be understood, the ignition valve is opened, the gas is compressed and a portion thereof forced into the ignition tube, and an explosion is produced which compels the next outward movement of the piston.

I have found that by making the air supply pipe E' adjustable with reference to the distance of its open end from the surface of the volatile liquid in the vaporizing chamber E the quantity and density of the vapor produced by the inflow of air may be nicely regulated and varied to produce the best results in the operation of the engine. I have also found that in starting the engine it will be advantageous to lower said pipe to bring its open end within a short distance of the surface of the volatile liquid and that, after the engine has started it should be raised to a greater distance from the surface of the liquid. By moving the said induction pipe up and down by hand while the engine is doing regular work its best position may be determined and it may be marked on its exterior to enable the operator to readily give it this position after having depressed it in starting the engine. The said pipe E' may also be adjusted to secure substantially uniform work of the engine from liquids of different degrees of volatility, requiring of course to be adjusted to a greater distance from the liquid surface in the use of more highly volatile liquids and at a less distance in the use of those which are less volatile.

From the fitting $d^9$ leads an exhaust pipe $D^4$ which will in practice be extended to a muffler of some suitable form at any desired distance from the engine. This exhaust pipe is provided near its connection with the ignition chamber with an air inlet provided with an inwardly opening check valve $D^5$, the object of which is to readily admit cool air to the interior of the cylinder in the outward movement of the piston $B^2$ when the engine is running above its limit of speed, the gas induction valve $D^2$ remaining closed at this time.

For the purpose of lifting the exhaust valve $D^3$ at the proper time, or when the outward extremity of movement of the piston $B^2$ is reached, I show a rock shaft G, mounted in bearings $g$ $g$, as shown in Fig. 2, said shaft having an arm $g^2$ engaged with the valve stem, and also an arm G' by which the shaft is operated. For this purpose the arm G' engages a cam H mounted on a shaft H' to which is fixed a sprocket wheel $H^2$ driven by a chain from a sprocket wheel $c$ of half the diameter of the wheel $H^2$, fixed on the crank shaft C, as indicated in Figs. 1 and 2. The direction of motion of the cam H is indicated in Fig. 6 by the arrow applied to the sprocket wheel $H^2$ and the timing of the cam H with reference to the position of the piston $B^2$ is shown clearly in Fig. 1. That is to say, at or near the outer extremity of alternate movements of the piston (running within its speed limit) the projection $h$ of the cam H, bearing on a wheel $g'$ mounted on the side of the arm G', throws said arm downward and correspondingly lifts the opposite arm $g^2$ of the rock shaft G against the lower end of the stem of the exhaust valve $D^3$ and raises the latter off its seats, as indicated in Fig. 5. The cam H is constructed with a suitable extended surface on its projecting portion, as indicated in Fig. 6, so that, during the next return of the piston, the exhaust valve will be sustained in its raised or open position.

For the purpose of keeping the exhaust valve $D^3$ raised and the exhaust pipe $D^4$ continually open during the period of excessive speed of the engine, the governor I (Fig. 2), the shaft $i$ of which is driven by a sprocket wheel $I'$, has its bent lever arms $i'$ engaged with a grooved collar $I^2$ arranged to slide on the shaft $i$, and in the groove of this collar runs a pin $j$ projecting from a vibrating stop lever J. This lever J is shown as being pivoted at its upper end to a suitable support and provided at its lower end with a shoulder $j'$ adapted to be thrown outward over the end of the arm $G'$ when the latter is in the lowermost position given it by the cam H. When the speed of the engine reaches its prescribed limit, the governor throws the stop lever J far enough to engage the said lever $G'$ and retracts it from such engagement when the speed slackens to said limit. While the arm $G'$ is thus held depressed the exhaust valve $D^3$ is held open and no induction of gas or vapor and air will take place during this period. In any outward movement of the piston while the exhaust valve is thus held open, cool air will be induced through the easily opening check valve $D^5$ with the effect of cooling the cylinder. In order to more effectively prevent the gas induction valve $D^2$ from rising in the outward movements of the piston while the exhaust valve is held open, as described, I prefer to employ the bell crank lever K, pivoted at its angle to a suitable support and having an offset $k$ near the upper end of its vertical arm arranged in position to be struck by the projecting part $g^3$ of the lever shaft G when the latter is brought to its position for opening the exhaust valve, the horizontal arm of said lever K being connected by a contractile coiled spring with the lower end of the stem of the gas induction valve, as indicated by dotted lines in Fig. 1. This spring is held in tension and its force tends to retain the eduction valve on its seat so long as the eduction or exhaust valve is held raised, and as a consequence the forward movements of the cylinder produce inflow only through the exhaust pipe $D^4$.

To stop the engine the rock shaft G is shown provided with an additional arm $G^2$ at its outer extremity, which arm $G^2$ may be directly employed as a hand lever but with which I prefer to employ a hand lever $G^3$ (Fig. 1) pivoted between its ends and arranged to bear, after the manner of a cam, upon the upper and outer end of the lever $G^2$ so as not only to depress said lever but to hold it in its depressed position and to thereby lock the exhaust valve $D^3$ in its elevated or open position shown in Fig. 5. The exhaust valve may have a contractile spring $d^{11}$ connected with its lower stem, as illustrated in Fig. 1, to more perfectly insure its closure when the arm $g^2$ of the rock shaft is depressed.

The engine with all the improvements and features of construction above described, excepting those separately illustrated in Fig. 9, may be employed when illuminating or other suitable gas is to be used instead of the vapor of gasoline, by substituting in place of the vaporizer and its liquid supply regulator shown in said Fig. 9, the gas and air admission devices illustrated in Figs. 10 and 11. Describing these figures, L represents a fitting adapted to be screwed upon the end of the induction pipe $e$. This fitting has two branch pipes $L' L^2$ designed respectively for the admission of air and gas. Each of these pipes has an inwardly opening valve, that of the pipe $L'$ being shown at $l$ and that in the pipe $L^2$ at $l'$. Besides differing in size with general regard to the relative quantities of air and gas to be admitted, the valves $l$ and $l'$ are desirably adjustable severally as to their resistance to the suction produced by the forward movement of the piston in the power cylinder and by which they are opened, to which end they are shown connected by contractile springs $l^2$ with devices for adjusting the tension of said springs. These tension devices may be of any suitable kind. The adjusting device shown for the spring of the air induction valve consists of a screw $L^3$ threaded through a plug or head at the end of the pipe $L'$, a set nut $l^3$ being applied to said screw to hold it from accidental disturbance after adjustment. The pipe $L'$ in this case has a lateral opening or openings for the admission of air, as, for example, illustrated at $l^4$. The gas induction pipe $L^2$ is shown as having a movable plug $L^4$ provided with a smooth surface and passing through a stuffing box or packing at the upper end of the tube. This plug is held in any position to which it may be adjusted, by means of a set screw $l^5$. This gas induction tube $L^2$ is joined with a transverse pipe or tube $L^5$ with which it communicates through a horizontal opening $l^6$. Between this lateral opening $l^6$ and the source of gas supply the tube is fitted with a valve seat $l^7$ against which bears the needle valve $L^6$ which is of course opened constantly during the operation of the machine and will be closed when the machine is not running. If desired a second power cylinder may be arranged parallel with the cylinder shown and may have its induction passage to the ignition chamber connected with the same induction pipe $e$ which leads to the cylinder shown. It should, however, have a separate exhaust pipe corresponding in all respects with $D^4$, as shown and above described. In this case the shaft $H'$ will be provided with a second cam corresponding with the cam H. This and other devices for controlling the exhaust valve of the second cylinder are illustrated in Figs. 12, 13 and 14. By reference to these figures it will be seen that $G^4$ is a rock shaft corresponding with the shaft G already described. This shaft $G^4$ is mounted in bearings on opposite sides of the first cylinder B and extends beneath said cylinder, as indicated by dotted lines in Fig. 12, its remote arm extending beneath the stem of the exhaust valve in the ignition box of the second cylinder $B^3$ in the same manner as that of the shaft G has been described as engaging with the valve $D^3$ of the first cylinder B.

$H^3$ is the second cam on the shaft $H'$ applied thereto inside of the sprocket wheel and the inner bearing of said shaft. Adjacent to the plane of this cam $H^3$ rises from the shaft G an arm $G^5$ corresponding with the arm $G'$ but more nearly vertical and similarly provided with a wheel for engagement with the peripheral surface of the cam $H^3$.

$J'$ is a fork having arms $j^2 j^3$ arranged in a plane transverse to the arms or levers $G' G^5$. The arm $j^2$ is provided with a hook $j^4$ and above it with an inclined surface $j^5$ against or in proximity with which the end of the lever $G^5$ vibrates in the operation of the engine within its limit of speed, the lever or arm, however, passing below the hook when depressed by the cam $G^5$. The inclined arm $j^3$ has its extremity bent into a vertical direction and this vertical portion of said arm bears against the prolonged extremity of the lever G in the operation of the engine within its limit of speed, said lever, however, passing below the angle of the arm $j^3$ when depressed by the cam H. Against the fork $J'$ bears a spring $j^6$ of any suitable construction arranged to throw the fork arms toward the levers, as indicated in Fig. 14, but the hook $j^4$ is prevented from engagement with the lever $G^5$ when the engine is running within its limit of speed by the presence of the lever $G'$ opposite the vertical portion of the arm $j^3$. When, however, the lever $G'$ is locked in its depressed position by action of the governor on the locking lever J (Figs. 6 and 7) then the hook $j^4$ is free to engage the lever $G^5$ when said lever next passes to its lowest position. The attainment of excessive speed on the part of the engine therefore results in locking down both the lever $G'$ and the lever $G^5$ and, consequently, in upholding the exhaust valves of both cylinders. When the lever $G'$ is released it rises (by action of the spring—or otherwise) and by bearing against the arm $j^3$ of the fork throws the hook $j^4$ out of engagement with the lever $G^5$ and releases the latter so that both exhaust valves are allowed to again seat in their proper order and both cylinders to be again brought into operation.

It is obvious that the several novel devices herein described may be varied in their form without departure from my invention. For example, other forms may be given to the devices by which the valve which opens and closes the ignition tube and which is located within the ignition chamber, may be operated by movement of the piston. It is also not essential to the vaporizing device illustrated in Fig. 9 that the particular form of supply regulating mechanism shown in said figure be employed, or indeed that an automatic supply regulator of any kind be used, inasmuch as a supply of liquid to the vaporizing chamber E may be controlled by hand, though with the objectionable necessity of watchfulness and care. I therefore hereinafter claim the said vaporizing chamber independently of means for regulating the supply of liquid thereto as well as in combination with regulating mechanism generally and with the float form of such mechanism herein shown.

The devices shown in Figs. 10 and 11 are not herein claimed.

I claim as my invention—

1. In combination with the ignition chamber having an opening to an ignition tube, of a rock shaft provided with an arm carrying a valve for said opening, and with a second arm, and a projection on the piston engaging said second arm for the purpose of rocking the shaft and opening the valve.

2. In a gas engine, the combination with a piston cylinder, a piston and an ignition chamber having an exhaust passage, of a valve controlling said exhaust passage, a rock shaft having an arm adapted to engage and open said valve and having a second arm whereby said rock shaft may be vibrated, a rotating shaft provided with a cam engaging said second arm of the rock shaft and timed with reference to the movement of the piston to open the valve at or near the outer position of said piston, suitable driving mechanism for actuating said cam shaft, a governor engaged with a sliding collar, and a vibrating stop lever engaged with the sliding collar and adapted to engage the second arm of the rock shaft when the latter is in the position given it by the cam and when the limit of speed is reached or exceeded, whereby the exhaust valve is kept open while the excessive speed is continued.

3. In a gas engine adapted for the use of vapor of gasoline or other suitable volatile liquid, the combination, with the piston and cylinder, of a vaporizing chamber having an induction tube for the volatile liquid, an eduction pipe for the mixed vapor and air connecting with the cylinder, and an air induction tube arranged with its inner open end above the surface of the liquid in said chamber and adjustable with reference to said surface.

4. In a gas engine, the combination, with the piston and cylinder, of a vaporizing chamber having an outlet for mixed vapor and air connecting with the cylinder, an air-inlet tube arranged with its inner open end above the surface of the liquid within said chamber, a pipe for conducting liquid to said chamber, and means for regulating the supply of liquid to said chamber.

5. In a gas engine, the exhaust pipe of which has an air inlet provided with a check valve adjacent to the ignition chamber, the combination, with the induction valve, of a spring arranged to cause the valve to bear with greater force on its seat, said spring being connected with a movable part of the engine adapted to increase the tension of the spring while the exhaust valve is open.

6. In a gas engine having two power cylinders, and a single governor, the combination of two cams driven positively by the crank shaft, two lever systems, one acted upon by each cam and operating to open the exhaust valves of the cylinders, a stop or locking mechanism for one of said lever systems controlled by the governor and a lock for the other lever system controlled by a lever of the system the stop of which is controlled by the cam.

7. In combination with the cams H and $H^3$, the rock shafts G $G^4$ bearing on the exhaust valves and provided with arms $G'$ $G^5$ for engagement with said cams, a locking or stop device, as J, and its controlling mechanism for engaging the lever $G'$ when the limit of speed is exceeded, and a lock or stop for the lever $G'$ normally tending to engage said lever upon the depression of the latter and provided with the part which is in engagement with the lever $G'$ whereby the lever $G^5$ is engaged by the hook only when the lever $G'$ is held in its depressed position by its stop or locking mechanism.

8. The combination with the two rock shafts G $G^4$, the cams H and $H^3$, and a stop mechanism operated by the governor and engaging with the lever $G'$, of the fork $J'$ provided with arms $j^2 j^3$, and a spring $j^6$ arranged to throw the arms of said fork into bearing against the arms $G'$ and $H^3$ of said rock shafts G $G^4$, substantially as described and for the purposes set forth.

In testimony that I claim the foregoing as my invention I affix my signature in presence of two witnesses.

GEORGE W. LEWIS.

Witnesses:
M. E. DAYTON,
C. CLARENCE POOLE.